Patented Apr. 24, 1923.

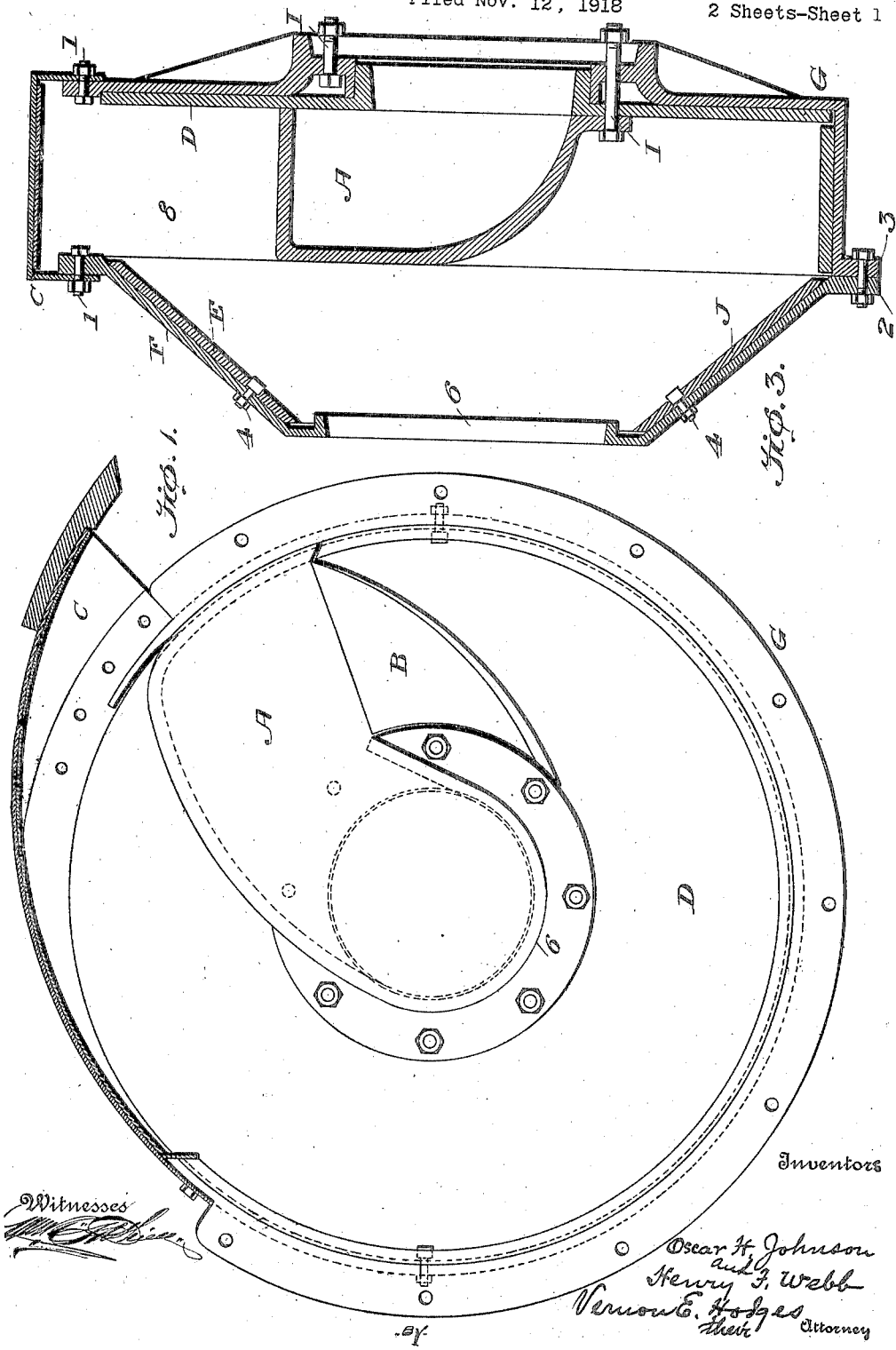

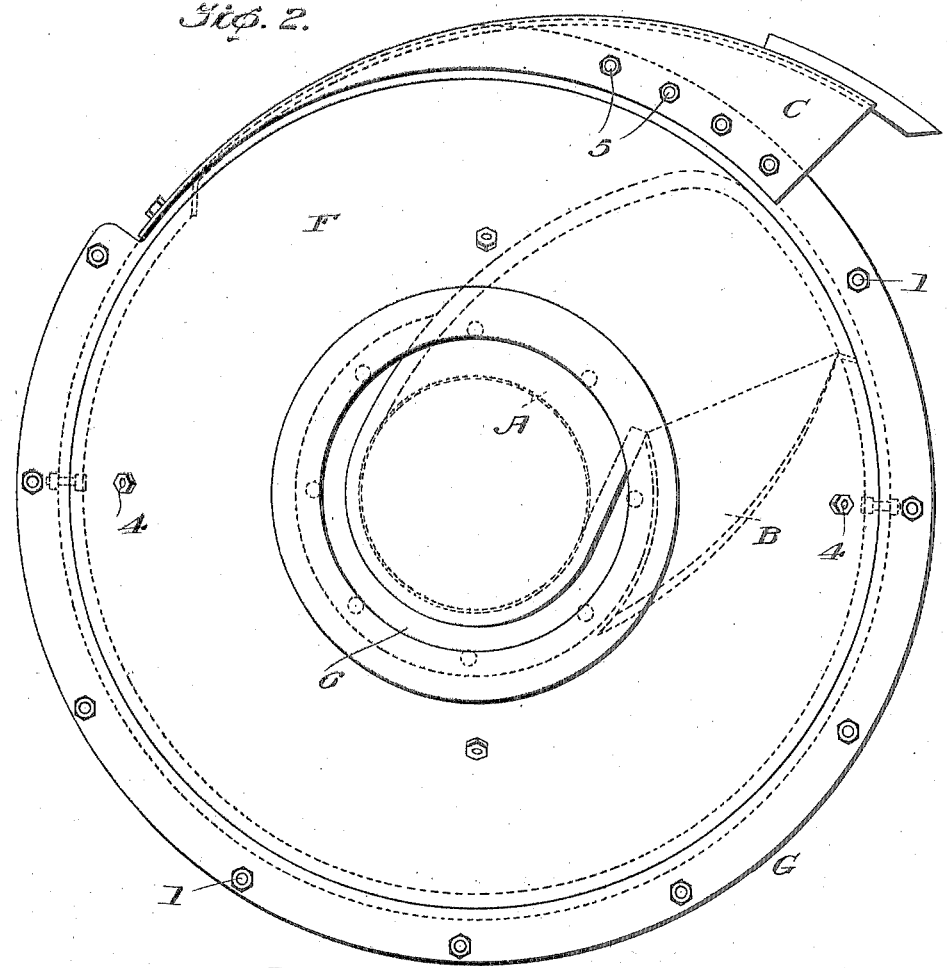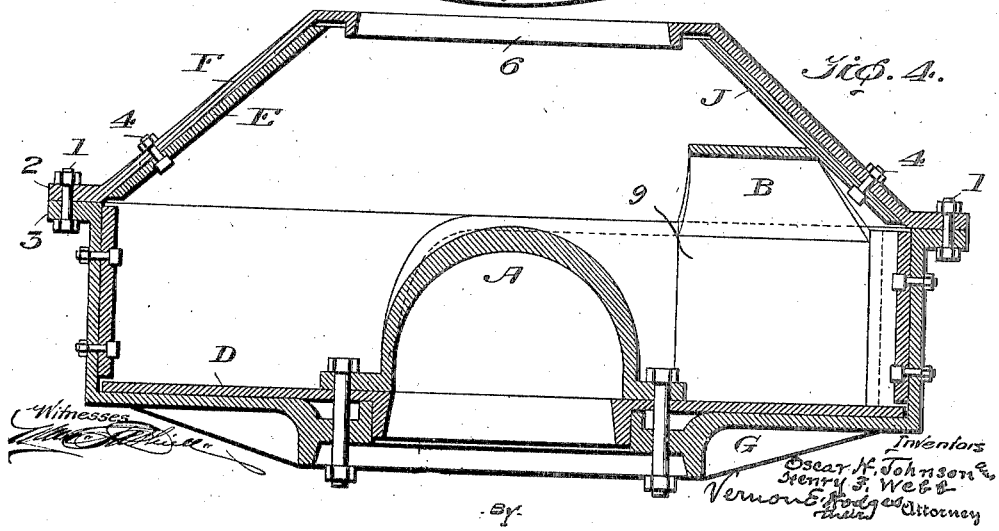

1,453,143

UNITED STATES PATENT OFFICE.

OSCAR H. JOHNSON AND HENRY F. WEBB, OF DENVER, COLORADO, ASSIGNOR TO THE MINE & SMELTER SUPPLY COMPANY, OF DENVER, COLORADO, A CORPORATION OF COLORADO.

DRUM FEEDER.

Application filed November 12, 1918. Serial No. 262,197.

*To all whom it may concern:*

Be it known that we, OSCAR H. JOHNSON and HENRY F. WEBB, citizens of the United States, residing at the city and county of Denver, and State of Colorado, have invented certain new and useful Improvements in Drum Feeders, of which the following is a specification.

Our invention relates to an improvement in drum feeders of the so-called Johnson-Webb type for use with ball and tube mills.

The primary object of this invention is to maintain all of the good features of the present form of feeder, and in addition to produce a feeder that will be more easily constructed, and one which can be relined, thus greatly prolonging its life.

This invention, therefore, consists in a feeder made in sections, thus rendering the castings easier to make than where they are made in one piece, and doing away to a very large extent with the internal foundry strains on the casting.

The invention further consists in removable or detachable outside and inside scoops which do not form a continuous conduit and liners, whereby all these parts may be renewed or replaced.

These improvements mean a great saving in material, for when the linings and scoops are worn, they can be easily and quickly renewed, whereas in the present type of feeder the whole feeder must be thrown away once it is worn through at any point.

In the accompanying drawings:

Figure 1 is a view of the feeder with the end cone and cone-liner removed;

Figure 2 is a front view of the feeder with the end cone and cone-liner in place.

Figure 3 is a vertical section of the feeder along the center line;

Figure 4 is a horizontal section of the feeder taken along the horizontal center line.

Our improved feeder is made in sections and comprises the main casting or body portion G which forms the one end and the center of the drum, and the end cone F removably secured thereto by bolts 1 extending through the meeting flanges 2 and 3 on said parts.

Removable liners E, D and J are fastened in place by bolts or similar means 4.

The internal scoop A and the flaring wing B by preference are removably secured within the drum, preferably by the same bolts 1 which secure the liner D in the casting G, as shown in Figures 3 and 4. This scoop A may also be held in place by utilizing the same bolts 1 which fasten the feeder to the mill.

The collecting wing B may be either cast integral with the inner scoop, or made separable and bolted thereto, thereby making it possible to renew the wing from time to time. This collecting wing is made to fit and is located inside of the cone cover liner, as shown in Figs. 1, 2 and 4. The wing B is located at the inlet end of the internal scoop A, and its function is, as its name implies, to assist in collecting and gathering in more feed from the drum and directing the feed quicker and more positively into the opening of the inner scoop, as shown in Fig. 4. The wing increases the approach into the internal scoop.

The outer scoop C is also removable by means of bolts 5.

It is understood that a drum of this type has the two feeds, namely the peripheral feed and elevation through the scoop C, and the axial feed through the opening 6 in the outer end of the cone F.

The external scoop C has a groove of much greater radius than that of the periphery of the drum, and it is so attached that its discharge end into the drum is located over an opening immediately back of the internal scoop, as shown in Fig. 1, which provision is made to insure scooping and holding a maximum amount of ore caught by the scoop, a large portion of which might otherwise be spilled or dropped. The material which is picked up by this external scoop drops into the large space 8 provided in the drum, and which extends from that point around into the inlet 9 into the internal scoop A, thus acting as a magazine or a source of supply for the inner scoop. The inner scoop A draws its supply from this magazine.

Thus we have presented a novel form of drum-feeder in which all of the parts sustaining wear, including both external and internal scoops and the inner surface of the drum, are renewable and easily replaced, and in which the drum itself is so cast in sections rather than a single piece, that the ordinary objections to this type of feeder are overcome.

We claim:

1. A drum feeder made in sections including a main casting or body portion which forms one end and the center of the drum, an end cone removably secured thereto, an internal scoop located within the center of the drum, and a wing located at the inlet of said internal scoop and flaring into the end cone.

2. A drum feeder made in sections including a main casting or body portion which forms one end and the center of the drum, an end cone removably secured thereto, an internal scoop located within the center of the drum, a wing located at the inlet of said internal scoop and flaring into the end cone, a liner interposed between the internal scoop and the adjacent wall of the drum, and key bolts passing through said wall, liner and internal scoop as a common means for securing said parts together.

3. A drum feeder made in sections including a main casting or body portion which forms one end and the center of the drum, and having an outlet at the center, an end cone removably secured thereto, a liner removably facing the outer wall of the central portion of the drum and its central outlet, an internal scoop located within the center of the drum, bolts extending through the outer wall of the drum, the liner and the internal scoop providing a common means for securing said parts together.

4. A drum-feeder having removable liners and a removable internal scoop, and common means for securing the drum and internal scoop and its adjacent liner to the mill to which the drum is applied.

5. A drum feeder having an internal scoop and a flaring wing located at the mouth of the scoop and cast integral therewith and the scoop and wing removably secured within the drum.

6. A drum-feeder having a body portion with internal and external scoops indirectly connected therewith at different parts of its periphery, and which form a non-continuous conduit.

7. A rotary drum feeder comprising a rotatable body, the main portion of which is formed of detachable sections and including a drum proper, an inner scoop within the drum and an outer scoop on the periphery of the drum and having axial inlet and outlet openings said scoops having separate connections with said body portion.

In testimony whereof we affix our signatures.

OSCAR H. JOHNSON.
HENRY F. WEBB.